(12) United States Patent
Van Vlierberghe

(10) Patent No.: US 12,723,922 B2
(45) Date of Patent: Sep. 1, 2026

(54) METHOD AND SYSTEM FOR DETERMINING A SERIES OF TEMPERATURE VALUES OF A MOLTEN METAL BATH

(71) Applicant: Heraeus Electro-Nite International N.V., Houthalen (BE)

(72) Inventor: Michel Van Vlierberghe, Houthalen (BE)

(73) Assignee: HERAEUS ELECTRO-NITE INTERNATIONAL N.V., Houthalen (BE)

( * ) Notice: Subject to any disclaimer, the term of this patent is extended or adjusted under 35 U.S.C. 154(b) by 405 days.

(21) Appl. No.: 18/254,780

(22) PCT Filed: Dec. 1, 2021

(86) PCT No.: PCT/EP2021/083733

§ 371 (c)(1),
(2) Date: May 26, 2023

(87) PCT Pub. No.: WO2022/117628

PCT Pub. Date: Jun. 9, 2022

(65) Prior Publication Data

US 2024/0027273 A1 Jan. 25, 2024

(30) Foreign Application Priority Data

Dec. 2, 2020 (EP) .................................... 20211288

(51) Int. Cl.

| | |
|---|---|
| ***G01J 5/00*** | (2022.01) |
| ***G01J 5/08*** | (2022.01) |
| ***G01J 5/0821*** | (2022.01) |

(52) U.S. Cl.
CPC ............. *G01J 5/004* (2013.01); *G01J 5/0821* (2013.01); *G01J 5/084* (2013.01)

(58) Field of Classification Search
CPC .......... G01J 5/004; G01J 5/0821; G01J 5/084; G01J 5/026; G01J 5/048; G01J 5/00; G01J 5/08; G01J 5/02
See application file for complete search history.

(56) References Cited

U.S. PATENT DOCUMENTS

| | | | | |
|---|---|---|---|---|
| 5,109,277 A * | 4/1992 | James | .................. | G01J 5/0044 702/135 |
| 2007/0268477 A1* | 11/2007 | Dams | .................... | G01J 5/0205 374/208 |
| 2018/0180484 A1* | 6/2018 | Kendall | ................ | G01K 1/022 |

FOREIGN PATENT DOCUMENTS

| | | | | |
|---|---|---|---|---|
| CA | 2589377 A1 * | 11/2007 | ................ | G01J 5/53 |
| EP | 0211820 A2 | 2/1987 | | |
| EP | 0646778 A1 | 4/1995 | | |
| EP | 2386293 T3 * | 8/2012 | | |
| EP | 2554959 A1 * | 2/2013 | ................ | G01J 5/00 |

(Continued)

*Primary Examiner* — Laura Martin Sweeney
*Assistant Examiner* — Julia Fitzpatrick
(74) *Attorney, Agent, or Firm* — Blank Rome LLP

(57) ABSTRACT

The present invention relates to a method and a system for determining a series of at least two temperature values of a molten metal bath with a device comprising an optical cored wire and a detector. The method according to the invention has been proven to be especially suitable for multiple repeated measurements, wherein the temperature of the molten metal bath changes between the measurements.

19 Claims, 4 Drawing Sheets

(56) References Cited

FOREIGN PATENT DOCUMENTS

| | | | | | |
|---|---|---|---|---|---|
| EP | 2799824 | A1 | | 11/2014 | |
| EP | 3051262 | B1 | | 7/2018 | |
| FR | 2776382 | A1 | * | 9/1999 | ................ G01J 5/60 |
| GB | 2507116 | B | | 9/2014 | |
| JP | S59150643 | A | | 8/1984 | |
| JP | H10185698 | A | | 7/1998 | |
| JP | 2000505549 | A | * | 5/2000 | ............... G01K 7/02 |
| JP | 2010071666 | A | | 4/2010 | |
| JP | 2014219395 | A | | 11/2014 | |
| JP | 2017530257 | A | | 10/2017 | |
| RS | 56309 | B1 | * | 12/2017 | ............. G01J 5/042 |
| WO | 2016/026530 | A1 | | 2/2016 | |

* cited by examiner

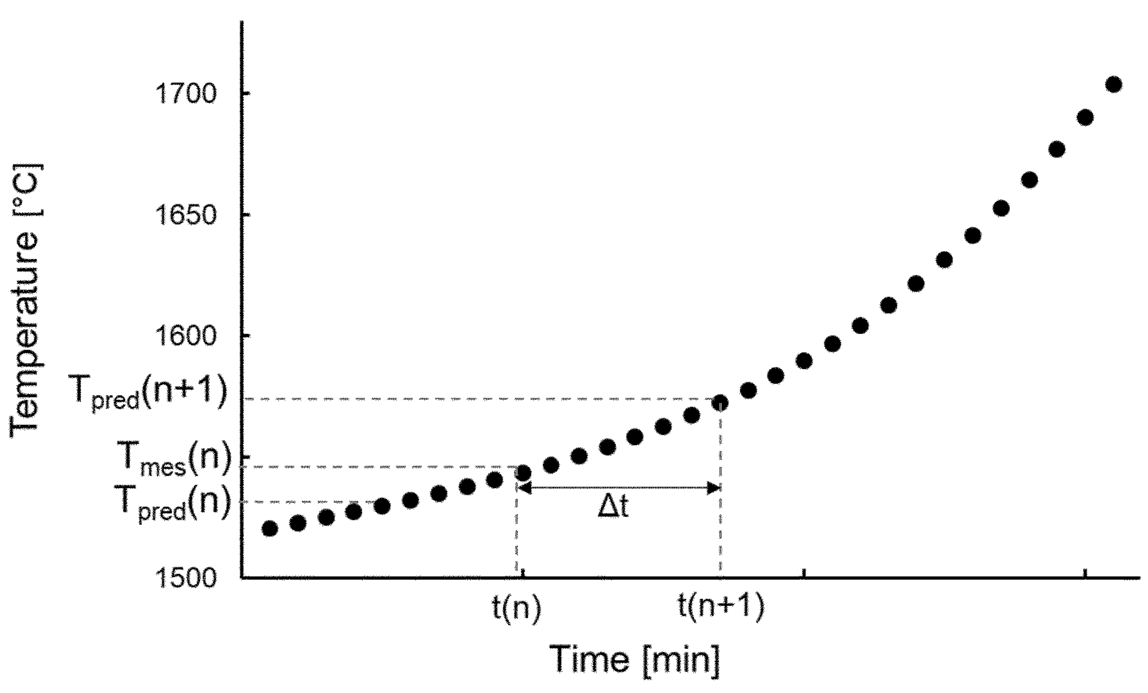
Fig. 7
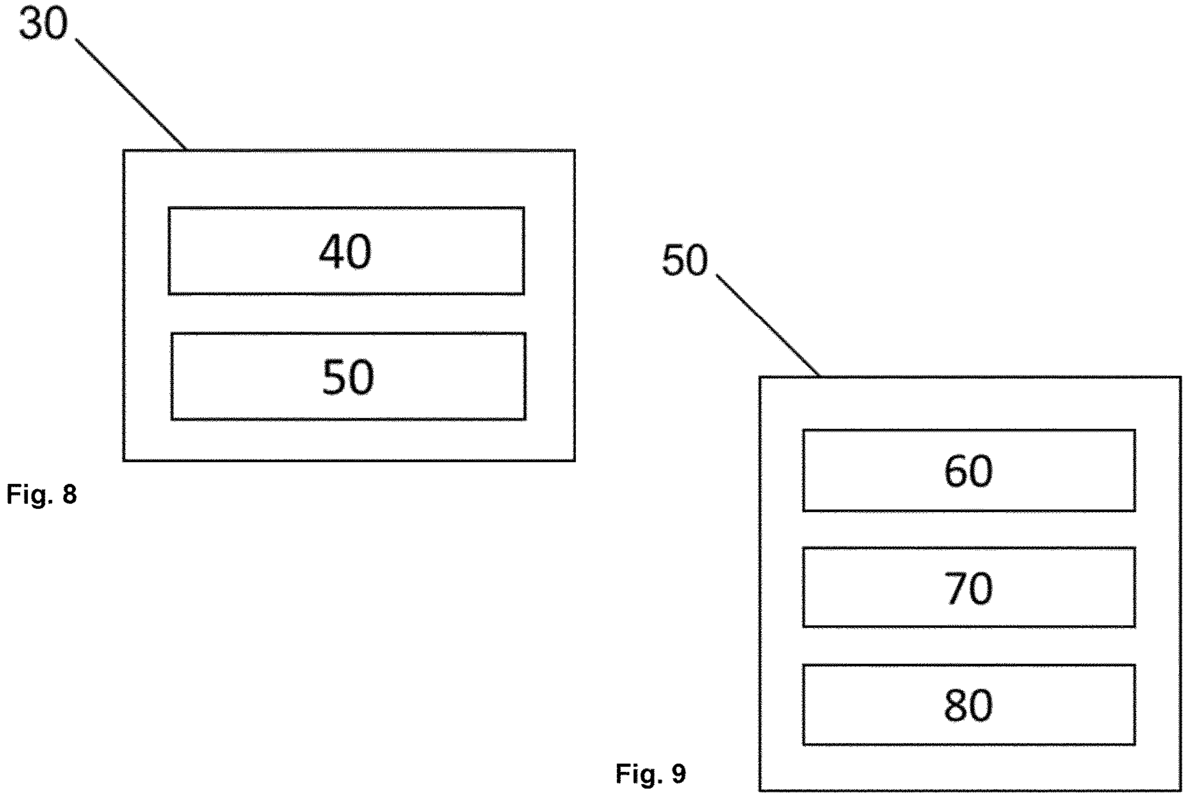
Fig. 8
Fig. 9

METHOD AND SYSTEM FOR DETERMINING A SERIES OF TEMPERATURE VALUES OF A MOLTEN METAL BATH

The present invention relates to a method and a system for determining a series of at least two temperature values of a molten metal bath.

The temperature of a molten metal bath in a metallurgical vessel is a critical parameter during the metal making process, which determines the quality of the resulting product. A possible means for measuring the temperature of the molten metal bath, particularly of iron or steel in a melting environment of an electric arc furnace (EAF), involves immersing an optical fiber surrounded by a metal tube into the molten metal. An optical fiber surrounded by a metal tube is often also referred to as optical cored wire.

For measuring the temperature of the molten metal bath, the optical cored wire can be fed into the metallurgical vessel. The leading tip of the optical cored wire is immersed into the molten metal bath, encountering on its way a hot atmosphere first, followed by a slag layer and then the molten metal bath. Once a portion of the optical cored wire is immersed below the surface of the molten metal bath, the optical fiber can convey thermal radiation received from the molten metal to a detector, e.g. a pyrometer. Suitable instrumentation can be associated with the detector for determining the temperature of the molten metal bath. During this measurement, the immersed portion of the optical cored wire may be partly or completely consumed by the molten metal bath. Once the temperature measurement has been concluded, the tip of the optical cored wire can be retracted from the molten metal bath. The tip of the retracted optical cored wire will become the new leading tip for the next temperature measurement.

Such a device is suitable for on-demand and semi-continuous temperature measurements in form of a series of immersion cycles. An operator can obtain a temperature measurement without any direct intervention with the harsh environment proximate to the metallurgical vessel.

To provide accurate measurements, blackbody conditions must be ensured in the vicinity of the immersed leading tip of the optical fiber while a measurement is obtained. The fiber must be immersed to a sufficient depth below the metal bath surface and at a location within the vessel which is representative for the temperature of the liquid metal bath. On the other hand, a deep immersion will increase the flotational forces on the optical cored wire and increase the consumption of the optical cored wire during a measuring sequence.

Several prior art documents disclose feeding methods for a metal coated optical fiber to improve the data quality of a temperature measurement.

For example, US2007268477A1 discloses a method of feeding wherein the feeding speed is adjusted during a measurement cycle. A thermal response is recorded during an initial feeding phase and compared to the change in detected temperature in a following second phase. This method has proven beneficial. On the other hand, it has been found that the method consumes significant amounts of the optical cored wire and that the measurement accuracy may still be further improvable. This may be due to the initial phase, during which the optical cored wire is mostly not immersed in the molten metal bath but encounters the environment of the melting furnace or the slag layer. Especially if a series of temperatures is desired to be measured, these factors become more prominent.

US2018180484A1 discloses a method for measuring the temperature of a molten metal bath suitable for multiple measurement cycles and without the requirement of additional equipment. The proposed feeding scheme comprises two feeding speeds followed by a stationary period, after which the temperature measurement is conducted. On the one hand, this method solves some of the problems known before. On the other hand, it does not address constantly changing conditions during the metal making process, especially the rising temperature of the molten metal, which affect the selection of an optimal temperature measurement protocol.

In view of the prior art, there is the need for a measurement method and a system which provides high accuracy over multiple measurement cycles and minimizes the consumption of optical cored wire.

The object of the invention is thus to provide an improved method for determining a series of at least two temperature values of a molten metal bath. In particular, one of the objects is to provide a method with improved measurement accuracy. Furthermore, it is an object to provide a method which allows to minimize the consumption of optical cored wire during a series of measurements.

A further object of the invention is to provide an improved system for carrying out the inventive method.

These objects are attained by the subject-matter defined in the independent claims.

The invention provides a method for determining a series of at least two temperature values $T_{mes}(n)$ and $T_{mes}(n+1)$ of a molten metal bath with a device comprising an optical cored wire and a detector, the method comprising (a) providing a set of data relating predicted temperature values $T_{pred}$ of a molten metal bath to corresponding measurement profiles MP;

(b) supplying a model F(t) describing the temperature development of the molten metal bath with time;

(c) defining a time step $\Delta t$;

(d) selecting a future point in time t(n) and predicting a temperature value $T_{pred}(n)$ of the molten metal bath for the point in time t(n);

(e) choosing a measurement profile MP(n) corresponding to the predicted temperature value $T_{pred}(n)$ from the provided set of data relating predicted temperature values $T_{pred}$ to corresponding measurement profiles MP;

(f) applying the measurement profile MP(n) at the point in time t(n) to obtain a measured temperature value $T_{mes}(n)$;

(g) calculating a predicted temperature value $T_{pred}(n+1)$ of the molten metal bath based on the measured temperature value $T_{mes}(n)$, the model F(t) and the time step $\Delta t$;

(h) choosing a measurement profile MP(n+1) corresponding to the predicted temperature value $T_{pred}(n+1)$ from the provided set of data relating predicted temperature values $T_{pred}$ to corresponding measurement profiles MP;

(i) applying the measurement profile MP(n+1) at a point in time t(n+1) to obtain a measured temperature value $T_{mes}(n+1)$, wherein t(n+1) is defined by $$t(n+1)=t(n)+\Delta t.$$

Furthermore, the invention provides a system for determining a series of at least two temperature values $T_{mes}(n)$ and $T_{mes}(n+1)$ of a molten metal bath, wherein the system comprises a device and a module and the module is adapted to interact with the device, wherein the device comprises an optical cored wire and a detector, wherein the module comprises a storage unit, a processing unit and a controlling unit, wherein the storage unit comprises (a1) a storage element for providing a set of data relating predicted temperature values $T_{pred}$ of a molten metal bath to corresponding measurement profiles MP;

(a2) a storage element for supplying a model F(t) describing the temperature development of the molten metal bath with time;

(a3) a storage element for defining a time step $\Delta t$;

wherein the processing unit comprises (b1) a processing element for selecting a future point in time and predicting a temperature $T_{pred}$ of the molten metal bath for the future point in time;

(b2) a processing element for choosing a measurement profile MP corresponding to a predicted temperature $T_{pred}$ from a provided set of data relating predicted temperature values $T_{pred}$ to corresponding measurement profiles MP;

(b3) a processing element for calculating a predicted temperature $T_{pred}$ of the molten metal bath based on a measured temperature value $T_{mes}$, a model F(t) and a time step $\Delta t$, and wherein the controlling unit comprises (c1) a controlling element for applying a measurement profile MP at a point in time to obtain a measured temperature value $T_{mes}$.

Preferred embodiments are defined in the dependent claims. The preferred embodiments may be realized individually or in any possible combination.

The method according to the invention has been proven to be especially suitable for multiple repeated measurements, wherein the temperature of the molten metal bath changes between the measurements. In particular, the temperature typically rises due to a continued heating. Surprisingly it has been found that the data quality of the measurement depends on the measurement profile which is applied to obtain a measurement. Especially the feeding of the optical cored wire into the molten metal bath has been identified as a quality affecting influence. The inventive method allows to determine temperature values with matching measurement protocols for a broad variety of temperatures of the molten metal bath. Furthermore, the inventive method allows a reliable positioning of the optical cored wire and its leading tip, which additionally makes it possible to obtain accurate temperature values with a minimal consumption of the optical cored wire. The term "consumption" as used herein refers to a disintegration of the optical cored wire, such as for example the melting and dissolution of the optical cored wire by and into the molten metal bath, a decomposition or burning of the whole optical cored wire or its different parts, and the like.

The invention provides a method for determining a series of at least two temperature values $T_{mes}(n)$ and $T_{mes}(n+1)$. A series of temperature values is used herein to describe a determination which is repeated at least once. The series of temperature values comprises at least the temperature values $T_{mes}(n)$ and $T_{mes}(n+1)$. Beyond $T_{mes}(n)$ and $T_{mes}(n+1)$ further temperature values may be determined.

Throughout this application variables related to temperatures or temperature values will be referred to with an upper-case T, while variables related to points in time, durations or time in general will be referred to with a lower-case t.

A variable without a designated index, i.e. (n) or (n+1) or the like, will be used to define the variable in general. A variable with a designated index will be used to refer to this variable for in a specific context. For example, $T_{mes}$ refers to the general definition of the measured temperature value $T_{mes}$, while $T_{mes}(n)$ refers to a specific measured temperature value.

According to the invention, the temperature values can be determined by measuring the temperature. The temperature measurement can, for example, be a single point or be a multiple point measurement and the possible related data processing.

The measured temperature value $T_{mes}(n)$ is understood as a temperature value which is obtained by a measurement at a specific point in time t(n). Accordingly, the measured temperature value $T_{mes}(n+1)$ is a temperature value which is obtained at a specific point in time t(n+1).

As used herein, the term "molten metal bath" describes a melt in a vessel. An alternative term for "molten metal bath" known to a skilled person is "metal melt". The molten metal of the molten metal bath is not particularly restricted. According to a preferred embodiment, the molten metal is molten steel. The term molten metal bath does not exclude the presence of any solid or gaseous parts, including for example non-molten parts of the respective metal. The molten metal bath may be covered with a slag layer.

The temperature of metal melts differs and usually depends on the composition of the metal and the stage of the melting process. According to a preferred embodiment, the temperature of the molten metal bath is in the range of 1500-1800° C. and more preferably in the range of 1500-1700° C.

The molten metal bath may be contained in a vessel comprising an entry point, suitable to feed an optical cored wire through. Such an entry point may be positioned in a side-wall panel or a roof covering the vessel.

According to the invention, the at least two temperature values $T_{mes}(n)$ and $T_{mes}(n+1)$ are determined with a device comprising an optical cored wire. Preferably, the optical cored wire is an optical fiber laterally surrounded by a metal tube. Preferably, the optical fiber is a flexible, transparent fiber. Optical fibers are most often used as means to transmit light, especially in the IR wavelength range, between the two ends of the fiber. Preferably, the optical fiber is formed from glass or plastic, more preferably from quartz glass. Preferably, the optical fiber is selected from the group consisting of graded index fibers and single-mode step index fibers. The metal tube surrounding the optical fiber can fully encircle the optical fiber or it can be at least partially open so that the casing is not fully encircling the optical fiber.

Preferably, the metal of the metal tube surrounding the optical fiber is iron or steel, preferably stainless steel.

In a preferred embodiment the linear density of the optical cored wire is in the range of 25-80 g/m, more preferably in the range of 35-70 g/m. The linear density is defined by the mass per unit length.

Preferably, the optical cored wire is laterally surrounded by at least one additional metal tube, i.e. at least two metal tubes surround the optical fiber laterally. Preferably, the optical cored wire is centrally arranged in the at least one additional metal tube.

Preferably, the at least one additional metal tube is not in contact with the optical cored wire. More preferably, the void space between these at least two metal tubes is at least partially filled with a material selected from the group consisting of gaseous or solid materials or a combination thereof. The solid material is preferably selected from the group consisting of inorganic materials, natural polymers, synthetic polymers and combinations thereof. The gaseous material is preferably a gas or a mixture of gases. More preferably, the gas is air or an inert gas.

According to a preferred embodiment, the optical cored wire comprises a plurality of separating elements arranged in the at least one metal tube, forming at least one compartment between the separating elements. Here, the term "compartment" relates to the volume between the different separating elements in the tube. The term "separating elements" relates to parts arranged inside the tube subdividing the volume within the tube. Preferably, separating elements are disc-shaped elements that are arranged inside the tube comprising an opening, through which the optical cored wire is extending and which can at least partly support the optical cored wire. The material of the separating elements is preferably selected from the group consisting of silicone, preferably two-component silicone, rubber, leather, cork, metal and combinations thereof.

The optical cored wire is optionally surrounded by at least one additional layer. This at least one additional layer may or may not replace said at least one additional metal tube. In a preferred embodiment, this at least one additional layer comprises a plurality of pieces, more preferably the layer comprises fibers.

In a further preferred embodiment, the material of the at least one additional layer has the form of a web, a net, a woven or a knitted structure.

Preferably, the at least one additional layer comprises a non-metallic material, most preferably an organic material.

It is to be understood that the optical cored wire may comprise any combination of the above described configurations. For example, it may be advantageous, that the optical cored wire is laterally surrounded by an additional layer and a second metal tube.

The device used to apply the method according to the invention further comprises a detector. The detector is coupled to one end of the optical cored wire and receives a light signal, in particular in the IR wavelength range, transmitted by the optical fiber. Preferably, the detector in the context of the present invention is a pyrometer.

The optical cored wire has an immersion end and an opposite end. The leading tip of the optical cored wire is the tip of the immersion end of the optical cored wire. Preferably, when the method according to the invention is applied, the optical cored wire is consumed in the direction from the immersion end towards the opposite end and after each measuring sequence, another part of the optical cored wire will be the immersion end; i.e. after each measurement sequence the leading tip is newly generated. The opposite end is connected to the detector and will not be consumed during a measurement.

In step (a) of the method according to the present invention a set of data relating predicted temperature values $T_{pred}$ of a molten metal bath to corresponding measurement profiles MP is provided.

Preferably, a set of data comprises data pairs in which one certain value of a type of data is assigned to a certain value of another type of data. More preferably, it comprises data pairs in which one certain value of a type of data is assigned to a model, a sequence of several steps or the like.

Preferably, a predicted temperature value $T_{pred}$ is as a temperature value which is not obtained by a measurement; i.e. is an estimated, an expected or a calculated temperature value. Possible sources for predicted temperature values $T_{pred}$ are empirically derived temperature values. Preferably, empirically derived temperature values of a molten metal bath are based on known characteristics of the molten metal bath in combination with known process parameters of the metal producing process. Such characteristics can for example be the mass of metal provided in the molten metal bath, the composition of the metal or the geometry of the vessel. Process parameters in this context may be the heating rate or the consumed energy, which are usually known parameters in a metal producing process. Furthermore, a predicted temperature value $T_{pred}$ may be derived based on a calculation. Preferably, such a calculation is based on a model for the development of the temperature of a metal bath of interest in combination with a known temperature value, for example from a previous measurement.

A measurement profile MP is to be understood as a sequence of steps which are carried out to obtain a value of interest. In the context of the present invention, the value of interest is the temperature of the molten metal bath.

In a preferred embodiment, the measurement profile MP defines at least one of the steps of (i) providing the leading tip of the optical cored wire above the surface of the molten metal bath;

(ii) feeding the leading tip of the optical cored wire for a time period from t0 to t2 with at least one feeding velocity $v_{fed}$ towards the molten metal bath and below the surface of the molten metal bath, wherein the leading tip of the optical cored wire is below the surface of the molten metal bath during a time period from t1 to t2;

(iii) obtaining temperature information within a measuring time period within t1 to t2;

(iv) retracting the leading tip of the optical cored wire with a velocity v ret to a position above the molten metal bath.

In other words, it is preferred that the measurement profile MP defines at least the steps (i) and/or (ii) and/or (iii) and/or (iv). Preferably, the measurement profile MP defines the steps (i), (ii), (iii) and (iv).

It is to be understood, that t1 and t2 are later than t0 and t2 is later than t1. t1 is the point in time the leading tip enters the molten metal bath; i.e. the point in time from which it is immersed below the surface of the molten metal bath. t2 is the point in time after which the leading tip is retracted towards a position above the surface of the molten metal bath.

Preferably, steps (i), (ii) and (iv) are performed in consecutive order.

Preferably, step (iii) is at least partly performed during step (ii).

The skilled person will understand that "providing the leading tip" and "feeding the leading tip" necessarily includes providing and feeding the optical cored wire, i.e. providing the optical cored wire having a leading tip and moving the optical cored wire with its leading tip.

It is to be understood, that the feeding velocity $v_{fed}$ refers to the average velocity of the leading tip during its feeding towards and below the surface of the molten metal bath.

The surface of the molten metal bath can be the surface facing the surrounding of the vessel or, in case of the presence of a slag layer, the surface facing the slag layer.

To obtain temperature information, the radiation emitted by the molten metal bath, especially in the IR wavelength range, and conveyed a by the optical cored wire to the detector is recorded. The intensity and/or spectral information of the radiation may be processed by a processing unit connected to the detector. The leading tip of the optical cored wire is preferably immersed under the surface of the molten metal bath at the point in time or during the measuring time period the temperature is obtained.

Preferably, the temperature information is obtained in a step resulting in the determination of a measured temperature value $T_{mes}$. Preferably, the determination of the measured temperature value $T_{mes}$ comprises the measurement of a single data point or the measurement of more than one data point; i.e. the measurement of a series of data points.

Preferably, the measured temperature value $T_{mes}$ is the mean value of the series of data points. More preferably, the measured temperature value $T_{mes}$ is derived based on the application of an algorithm processing the series of data points.

In a preferred embodiment, the feeding in step (ii) of a measurement profile MP comprises at least two feeding velocities $v_{fed}$1 and $v_{fed}$2. It is to be understood, that the feeding velocities $v_{fed}$1 and $v_{fed}$2 refer to average velocities the leading tip of the optical cored wire is fed with.

Preferably, the feeding in step (ii) of a measurement profile MP comprises a feeding velocity $v_{fed}$1 with which the leading tip is fed during t0 to t1 and a second feeding velocity $v_{fed}$2 with which the leading tip is fed during t1 to t2.

In a preferred embodiment, the second feeding velocity $v_{fed}$2 comprises more than one feeding velocity.

According to a preferred embodiment, the measurement profile MP defines a further step within a stationary time period within t1 to t2, during which the feeding of the leading tip of the optical cored wire is paused with or the leading tip of the optical cored wire is fed with a low speed. The term "pausing with the feeding of the leading tip" used herein means, that the leading tip is not actively moved. Both alternatives, a pausing of the feeding or a feeding with a low speed, result in a movement of the position of the leading tip towards the surface of the molten metal bath due to the consumption. Nevertheless, the leading tip is still immersed below the surface of the molten metal bath.

A low speed is preferably lower than 0.2 m/s, more preferably lower than 0.1 m/s.

Preferably, the set of data relating predicted temperature values $T_{pred}$ of a molten metal bath to corresponding measurement profiles MP additionally relates the measurement profiles to characteristics of the optical cored wire.

Preferably, the characteristic of the optical cored wire is its linear density.

Preferably, the duration of the time period from t0 to t2 of a measurement profile MP is defined the longer, the higher the linear density of an optical cored wire is.

Preferably, the feeding velocity $v_{fed}$ of a measurement profile MP is defined the lower, the higher the linear density of an optical cored wire is.

In step (b) of the method according to the present invention a model F(t) describing the temperature development of the molten metal bath with time is supplied.

The model F(t) describing the temperature development of the molten metal bath with time is a model defining a relationship between time t and temperature T; i.e. it is adapted to predict a temperature T(n) at a certain point in time t(n). In a typical melting process, the time is directly related to the electrical energy input.

Preferably, the time t is included as an input parameter in the model F(t), but F(t) can also be independent from the time t as input parameter.

Preferably, the model F(t) comprises mathematical equations, characteristic curves or other information defining the relations between time and temperature of the molten metal bath. It may contain relations describing the physical properties of the molten metal bath, the characteristics of the metallurgical facility and the corresponding model parameters.

Preferably, the physical properties of the molten metal bath are considered in the model F(t).

Preferably, the model F(t) is derived by a method selected from the group of numerical methods, analytical methods, experimental methods and combinations thereof.

Preferably, the model F(t) describing the temperature development of the molten metal bath with time is based on recorded measurements, i.e. data obtained in previous melting processes.

In a preferred embodiment, a predicted temperature value $T_{pred}$ or a measured temperature value $T_{mes}$ may be the only input parameter for the model F(t). In further examples, further input parameters may be utilized, preferably an operational parameter.

An operational parameter in this context is a parameter which is related to the melting process, for example the electrical energy input or the amount of chemical supplements which has been added to the molten metal bath.

In an exemplary embodiment, the model describing the temperature development F(t) is a linear function.

Preferably, the first derivative F'(t) of the model describing the temperature development F(t) is a linear function.

In a preferred embodiment, the model F(t) describing the temperature development of the molten metal bath with time is derived by a method comprising the steps (i) providing a set of data relating characteristics of a molten metal bath with recorded data for models F(t) for the development of the temperature of a molten metal bath with time;
(ii) providing characteristics of the molten metal bath;
(iii) receiving a model F(t) corresponding to the characteristics of the molten metal bath from the provided set of data relating characteristics of a molten metal bath with recorded data for models F(t) for the development of the temperature of a molten metal bath with time.

In step (c) of the method according to the present invention a time step $\Delta t$ is defined.

A time step $\Delta t$ is to be understood as a duration of time.

The duration of the time step $\Delta t$ is not further restricted. Preferably, the duration of the time step $\Delta t$ is in the range of 5 s-3 min, more preferably, in the range of 15 s-2 min, most preferably in the range of 30 s-90 s.

Preferably, the choice of the duration of the time step $\Delta t$ is based on operational parameters.

In a preferred embodiment, the duration of time step $\Delta t$ is derived by a method comprising the steps (i) providing a set of data relating operational parameters with durations for time steps $\Delta t$;
(ii) providing operational parameters;
(iii) receiving a duration for the time step $\Delta t$ from the provided set of data relating operational parameters with durations for time steps $\Delta t$ corresponding to the operational parameters.

Preferably, the choice of the duration of the time step $\Delta t$ is based on the measured temperature value $T_{mes}(n)$ determined in step (f).

In a preferred embodiment, the time step $\Delta t$ is derived by a method comprising the steps (i) providing a set of data relating measured temperature values $T_{mes}$ with durations for time steps $\Delta t$;
(ii) selecting a duration for the time step $\Delta t$ from the provided set of data relating measured temperature values $T_{mes}$ with durations for time steps $\Delta t$ corresponding to the measured temperature value $T_{mes}(n)$.

Preferably, step (c) is carried out after step (f) for both previously described embodiments.

In step (d) of the method according to the present invention a future point in time t(n) is selected and a temperature value $T_{pred}(n)$ of the molten metal bath for the point in time t(n) is predicted.

The term "predicting" is used herein to refer to the prediction of a future temperature value $T_{pred}(n)$ at a future point in time t(n). In other words, the predicted temperature value $T_{pred}(n)$ is an expected temperature at that future point in time t(n).

The selection of the future point in time t(n) is not further restricted. Preferably, it is related to a certain point in the process of the metal melting process, for example after a certain time period after the start of the process, after a certain amount of chemical supplements has been added or after a certain amount of energy has been consumed. The "energy consumption" in this context refers to the amount of energy which is consumed during the melting process; i.e. the amount of energy which has been supplied to the molten metal bath.

In a preferred embodiment, a set of data is provided relating points in time with predicted temperature values $T_{pred}$, from which the predicted temperature value $T_{pred}(n)$ is selected in step (d). Most preferably, the predicted temperature values $T_{pred}$ in the set of data represent empirically derived temperature values; preferably recorded temperature values of previous melting processes.

In step (e) of the method according to the present invention a measurement profile MP(n) corresponding to the predicted temperature value $T_{pred}(n)$ is chosen from the provided set of data relating predicted temperature values $T_{pred}$ to corresponding measurement profiles MP.

According to a preferred embodiment, choosing a temperature profile MP(n) is additionally related to the characteristics of the optical cored wire.

In step (f) of the method according to the present invention the measurement profile MP(n) is applied at the point in time t(n) to obtain a measured temperature value $T_{mes}(n)$.

The application of the measurement profile MP(n) results in the determination of the measured temperature value $T_{mes}(n)$ of the molten metal bath at the point in time t(n).

The measured temperature value $T_{mes}(n)$ may be higher or lower than the predicted temperature $T_{pred}(n)$.

Since the measured temperature value $T_{mes}(n)$ can differ from the predicted temperature $T_{pred}(n)$, the related points in time in the model F(t) describing the temperature development of the molten metal bath with time can differ. In other words, the point in time t(n) at which the temperature value $T_{mes}(n)$ is obtained does not necessarily correspond to the point in time for the predicted temperature $T_{pred}(n)$ in the model F(t).

In step (g) of the method according to the present invention a predicted temperature value $T_{pred}(n+1)$ of the molten metal bath is calculated based on the measured temperature value $T_{mes}(n)$, the model F(t) and the time step $\Delta t$.

In other words, step (g) results in in a predicted temperature value $T_{pred}(n+1)$ after a duration of time $\Delta t$ after the measurement of the measured temperature value $T_{mes}(n)$ at the point in time t(n). The prediction is based on the model F(t) with the measured temperature value $T_{mes}(n)$ and the time step $\Delta t$ as input parameters. The measured temperature value $T_{mes}(n)$ is furthermore directly connected to the point in time t(n).

In step (h) of the method according to the present invention a measurement profile MP(n+1) corresponding to the predicted temperature value $T_{pred}(n+1)$ is chosen from the provided set of data relating predicted temperature values $T_{pred}$ to corresponding measurement profiles MP.

According to a preferred embodiment, choosing a temperature profile MP(n+1) is additionally related to the characteristics of the optical cored wire.

In step (i) of the method according to the present invention the measurement profile MP(n+1) is applied at a point in time t(n+1) to obtain a measured temperature value $T_{mes}(n+1)$, wherein t(n+1) is defined by $$t(n+1)=t(n)+\Delta t.$$

The application of the measurement profile MP(n+1) results in the determination of the measured temperature value $T_{mes}(n+1)$ of the molten metal bath at the point in time t(n+1).

In a preferred embodiment, the feeding velocity $v_{fed}(n+1)$ of the measurement profile MP(n+1) is higher than the feeding velocity $v_{fed}(n)$ of the measurement profile MP(n).

Preferably in the case that measurement profiles MP defining at least two feeding velocities $v_{fed}$1 and $v_{fed}$2 are applied for the measurement profile MP(n) and the measurement profile MP(n+1), the feeding velocity $v_{fed}\mathbf{2}(n+1)$ of the measurement profile MP(n+1) is higher than the feeding velocity $v_{fed}\mathbf{2}(n)$ of the measurement profile MP(n).

Preferably, the duration of the time period from t1 to t2 is shorter for the measurement profile MP(n+1) than for the measurement profile MP(n).

Preferably, steps (d) to (i) are performed in consecutive order.

Preferably, step (a) is performed prior to steps (d) to (i), most preferably prior to steps (e) to (i).

More preferably, the method is performed in one of the following orders:

(a)-(b)-(c)-(d)-(e)-(f)-(g)-(h)-(i),
(b)-(a)-(c)-(d)-(e)-(f)-(g)-(h)-(i),
(b)-(c)-(a)-(d)-(e)-(f)-(g)-(h)-(i) or
(b)-(c)-(d)-(a)-(e)-(f)-(g)-(h)-(i).

According to a further preferred embodiment, step (b) is performed after step (f). More preferably, the method is performed in one of the following orders:

(a)-(c)-(d)-(e)-(f)-(b)-(g)-(h)-(i) or
(c)-(a)-(d)-(e)-(f)-(b)-(g)-(h)-(i).

According to a further preferred embodiment, supplying the model F(t) describing the temperature development of the molten metal bath with time comprises the steps (b1)-(b4):

(b1) Defining a maximum temperature difference $\Delta T_{max}$ between a predicted temperature $T_{pred}$ and a measured temperature value $T_{mes}$;
(b2) defining a maximum temperature step size $\Delta T_{step}$;
(b3) comparing the difference $\Delta T(n)$ between the measured temperature value $T_{mes}(n)$ and the predicted temperature $T_{pred}(n)$ with the maximum difference $\Delta T_{max}$;
(b4) supplying a model F(t), wherein $$F(t)=T_{pred}(n)+\Delta T_{step}$$

if $\Delta T(n)$ is higher than the defined maximum temperature difference $\Delta T_{max}$.

According to the preferred embodiment, supplying F(t) is not further restricted if $\Delta T(n)$ is lower than the defined maximum temperature difference $\Delta T_{max}$.

Preferably, step (b) comprising steps (b1)-(b4) is performed after step (f).

According to a preferred embodiment, the method is performed in one of the following orders:

(a)-(c)-(d)-(e)-(f)-[(b)-{(b1)-(b2)-(b3)-b4)}]-(g)-(h)-(i) or (c)-(a)-(d)-(e)-(f)-[(b)-{(b1)-(b2)-(b3)-b4)}]-(g)-(h)-(i).

Applying the inventive method according to the preferred embodiment comprising steps (b1)-(b4) preferably allows the prediction of temperature values based on a maximum temperature step size $\Delta T_{step}$.

Preferably, the temperature step size $\Delta T_{step}$ is a predetermined temperature difference.

This embodiment of the inventive method allows to avoid the application of measurement profiles which most probably do not match the actual temperature of the molten metal bath. In other words, it allows to adapt to measured temperature values obtained in a first measurement step, which most probably do not represent the actual temperature obtained.

Preferably, the method according to the invention is performed more than once.

The invention furthermore provides a system for determining a series of at least two temperature values $T_{mes}(n)$ and $T_{mes}(n+1)$ of a molten metal bath, the system comprising a device and a module, wherein the module is adapted to interact with the device.

Preferably, the system is configured to perform the method according to the invention, wherein the method comprises the following steps

- (a) providing a set of data relating predicted temperature values $T_{pred}$ of a molten metal bath to corresponding measurement profiles MP;
- (b) supplying a model F(t) describing the temperature development of the molten metal bath with time;
- (c) defining a time step $\Delta t$;
- (d) selecting a future point in time t(n) and predicting a temperature value $T_{pred}(n)$ of the molten metal bath for the point in time t(n);
- (e) choosing a measurement profile MP(n) corresponding to the predicted temperature value $T_{pred}(n)$ from the provided set of data relating predicted temperature values $T_{pred}$ to corresponding measurement profiles MP;
- (f) applying the measurement profile MP(n) at the point in time t(n) to obtain a measured temperature value $T_{mes}(n)$;
- (g) calculating a predicted temperature value $T_{pred}(n+1)$ of the molten metal bath based on the measured temperature value $T_{mes}(n)$, the model F(t) and the time step $\Delta t$;
- (h) choosing a measurement profile MP(n+1) corresponding to the predicted temperature value $T_{pred}(n+1)$ from the provided set of data relating predicted temperature values $T_{pred}$ to corresponding measurement profiles MP;
- (i) applying the measurement profile MP(n+1) at a point in time t(n+1) to obtain a measured temperature value $T_{mes}(n+1)$, wherein t(n+1) is defined by $$t(n+1)=t(n)+\Delta t.$$

For preferred embodiments related to the inventive method, it is referred to the preferred embodiments given above.

The system according to the invention comprises a device, wherein the device comprises an optical cored wire and a detector. For preferred embodiments related to the optical cored wire and the detector it is referred to the preferred embodiments given above for the inventive method.

The system according to the invention comprises a module, wherein the module comprises a storage unit, a processing unit and a controlling unit.

Preferably, the storage unit, the processing unit and the controlling unit are configured to interact with each other.

According to the invention, the storage unit of the module comprises

- (a1) a storage element for providing a set of data relating predicted temperature values $T_{pred}$ of a molten metal bath to corresponding measurement profiles MP,
- (a2) a storage element for supplying a model F(t) describing the temperature development of the molten metal bath with time and
- (a3) a storage element for defining a time step $\Delta t$.

According to the invention, the processing unit of the module comprises

- (b1) a processing element for selecting a future point in time and predicting a temperature $T_{pred}$ of the molten metal bath for the future point in time,
- (b2) a processing element for choosing a measurement profile MP corresponding to a predicted temperature $T_{pred}$ from a provided set of data relating predicted temperature values $T_{pred}$ to corresponding measurement profiles MP and
- (b3) a processing element for calculating a predicted temperature $T_{pred}$ of the molten metal bath based on a measured temperature value $T_{mes}$, a model F(t) and a time step $\Delta t$.

In a preferred embodiment, the processing unit is configured to process the information stored in the storage unit.

According to the invention, the controlling unit of the module comprises

- (c1) a controlling element for applying a measurement profile MP at a point in time to obtain a measured temperature value $T_{mes}$.

In a preferred embodiment, the controlling unit is configured to control the device.

In a preferred embodiment, the system comprises feeding means. In the context of the present invention, feeding means may be understood as means which allow the feeding of the optical cored wire into the molten metal bath. Such means may be selected from the group consisting of a feeder, a feeding control, a straightener and a guiding tube.

According to a preferred embodiment, the system further comprises a coil, which accommodates the length of the optical cored wire.

The idea underlying the invention shall subsequently be described in more detail with respect to the embodiments shown in the figures. It should be understood, however, that the invention is not limited to the precise arrangements and instrumentalities shown. Herein:

FIG. 7 shows the expected development of the temperature of a molten metal bath with time for an exemplary EAF process.

FIG. 8 shows a schematic view of a system according to an embodiment of the invention.

FIG. 9 shows a schematic view of a module according to an embodiment of the invention.

Figure 1:
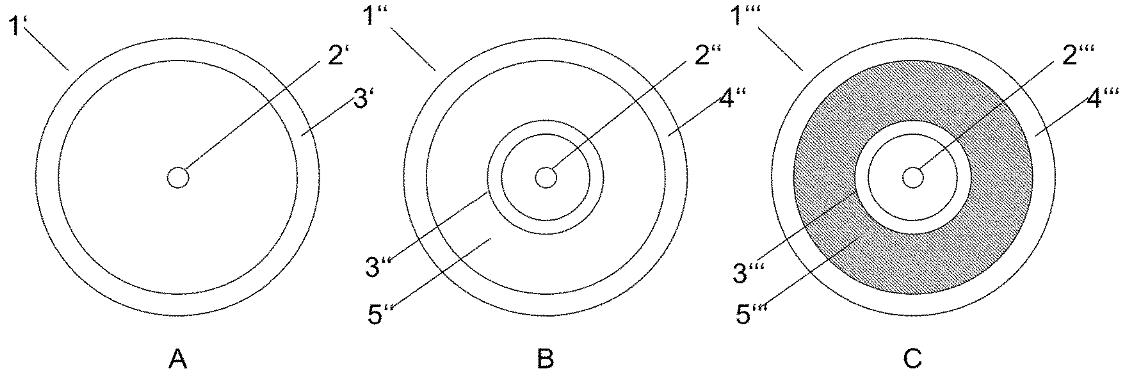
FIG. 1 shows schematic cross-sectional views of different designs of optical cored wires.

FIG. 1 shows schematic cross-sectional views of different designs of optical cored wires in accordance with exemplary embodiment of the invention. FIG. 1A shows an optical cored wire 1' which comprises an optical fiber 2' surrounded by a metal tube 3'.

FIG. 1 B shows an optical cored wire 1" which comprises an optical fiber 2" surrounded by a metal tube 3". A second metal tube 4" additionally surrounds metal tube 3". The void space between the two metal tubes 5" is not filled with a solid material; i.e. the void space may comprise a gas or a gas mixture.

FIG. 1 C shows an optical cored wire 1'" which comprises an optical fiber 2'" surrounded by a metal tube 3'" and a second metal tube 4'". The void space between the two metal tubes 5'" is filled with a filler material, for example fibers from an organic material or e-glass.

Figure 2:
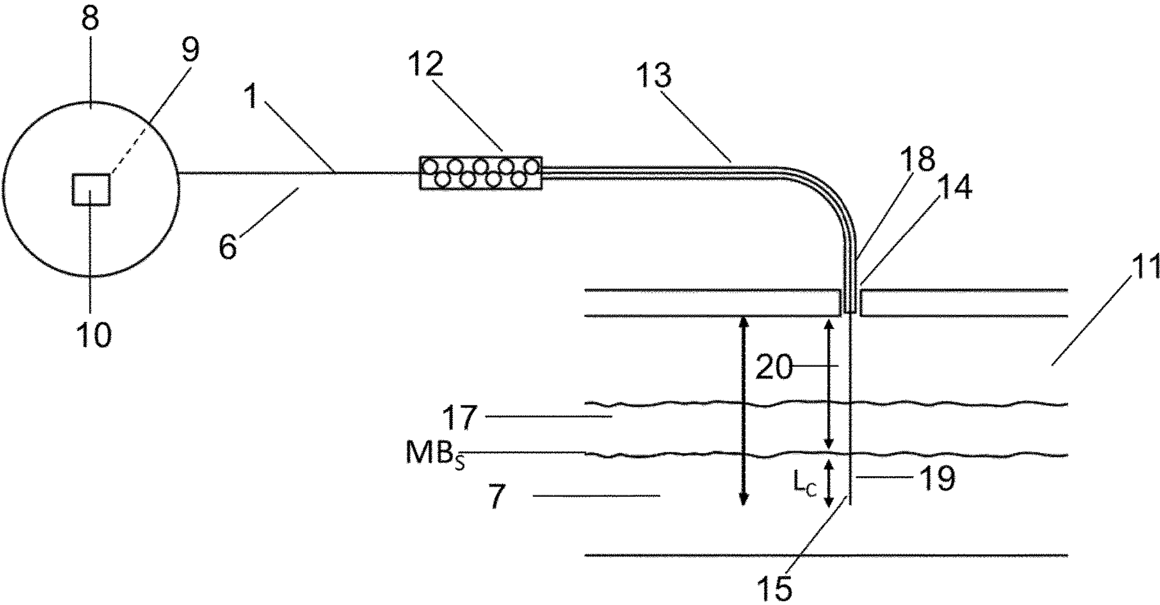
FIG. 2 shows a schematic view of an exemplary installation with a molten metal bath, of which the temperature shall be determined.

FIG. 2 shows a schematic view of an exemplary installation 6 with a molten metal bath 7, of which the temperature shall be determined The installation 6 comprises an optical cored wire 1 which is located at least partly on a coil 8 and is at least in part unwound from the coil 8 for conducting a measurement. One end of the optical cored wire 9 is connected to a detector 10 which in turn could be connected to a computer system (not shown) to process the data obtained with the optical cored wire 1 and the detector 10. The molten metal bath 7 is contained in a vessel 11 which may be an electric arc furnace (EAF), a ladle metal furnace (LMF) or a converter known to those skilled in the art for the processing of molten metal. The optical cored wire 1 is led by means of a feeder 12 through a guide tube 13 in the vessel 11 having an entry point 14. The shown configuration is used as an example, a roof with a respective entry point is not a pre-requisite for the present invention.

The configuration shown illustrates an exemplary measurement position of the optical cored wire 1 with the leading tip 15 immersed below the surface of the molten metal bath $MB_S$. The angle of immersion of the optical cored wire 1 with respect to the surface of the molten metal bath $MB_S$ is 90° in the presented embodiment. However, the angle can vary depending on the construction details of the metallurgical facility.

The temperature of a part of the optical cored wire 1 extending from the coil 8 to the entry point of the vessel 14 can be considered to be low, which could be a temperature ranging from room temperature up to 100° C. Once passing the entry point 14 in the direction of the molten metal bath 7, a hot atmosphere of up to 1700° C. or even higher is first encountered, followed by a slag layer 17 which is in turn followed by the molten metal bath 7. The entry point 14 to the vessel could be equipped with a blowing lance 18 to prevent metal and slag penetration into the guiding tube 13.

The optimal level of the molten metal bath 7 may be approximately known for each metallurgical vessel by its design and mode of operation.

To obtain a temperature measurement, the optical cored wire 1 is fed with its leading tip at the immersion end 15 towards the molten metal bath 7 to the required immersion depth. In order to obtain reliable temperature measurements, it may be desired to measure at a more or less fixed immersion depth in the molten metal bath. A suitable feeding system 12 will accurately control the feeding velocity of the optical cored wire 1.

After the measurement sequence, the part of the optical cored wire immersed in the molten metal bath 19 will be molten and thereby consumed. The length of this part is indicated with $L_c$. After the measurement is taken, the part of the optical cored wire 20 located in the hot atmosphere and extending through the slag layer can be fed back into the direction of the coil 8 and can be reused for the next measurement.

Figure 3:
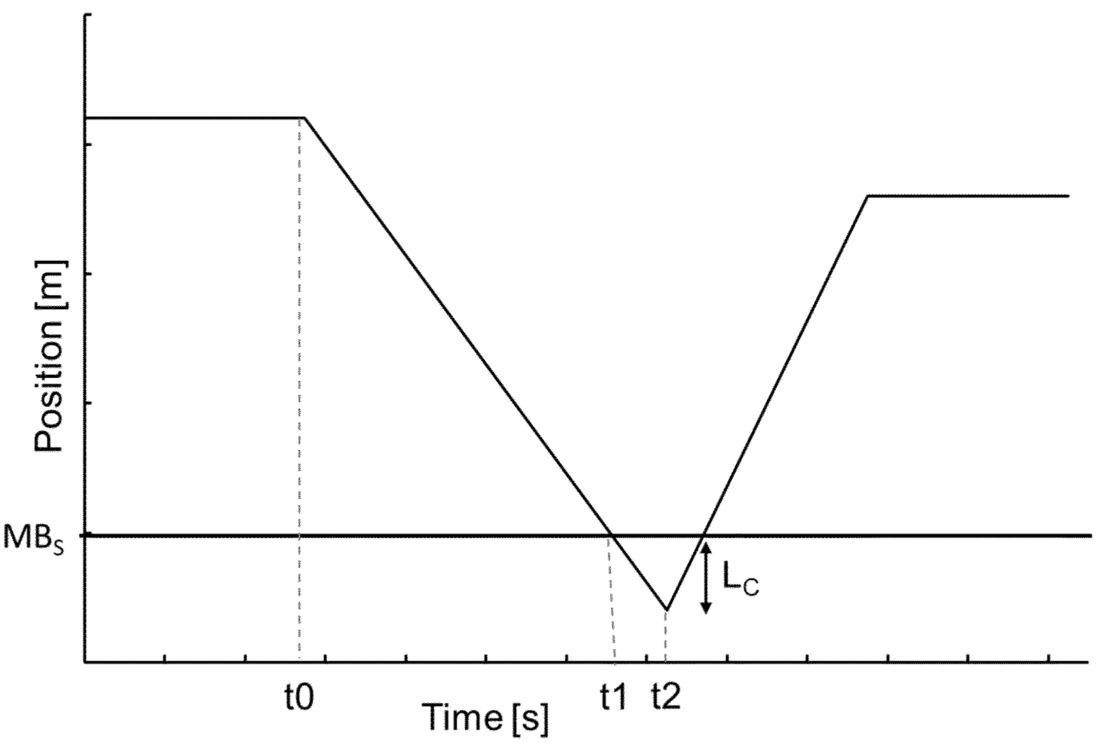
FIG. 3 shows a position-time graph indicating the immersion of the leading tip of the optical cored wire during the application of a representative measurement profile.
Figure 4:
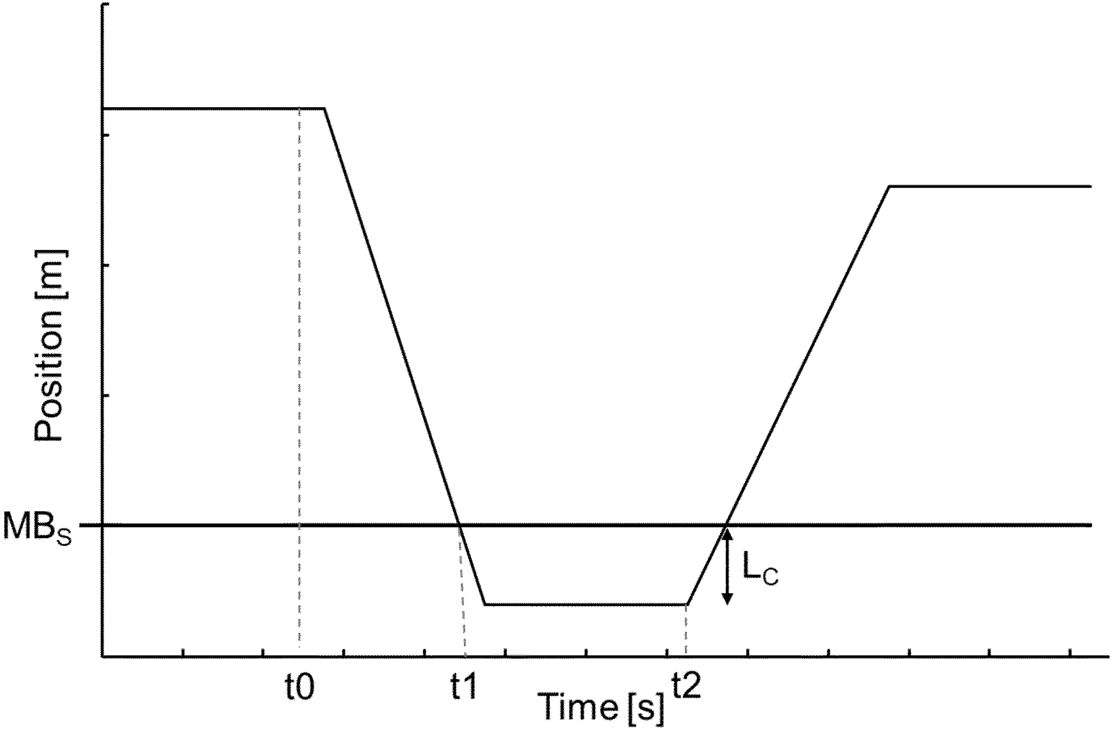
FIG. 4 shows a position-time graph indicating the immersion of the leading tip of the optical cored wire during the application of another representative measurement profile.

FIG. 3 shows a position-time graph indicating the immersion of the leading tip of the optical cored wire during the application of a representative measurement profile. The x-axis shows the time, whereas the y-axis indicates the position of the leading tip. The position of the surface of the molten metal bath $MB_S$ is indicated for orientation. Prior to the start of a measurement; i.e. prior to t0, the leading tip is positioned at a starting point. This may be inside the metallurgical vessel and proximate the entry point; i.e. close to the point where the optical cored wire enters the vessel. The optical cored wire is fed for a duration from t0 to t2 with a feeding velocity towards and into the molten metal bath. This duration is typically in the range of seconds. The leading tip of the optical cored wire enters the molten metal bath at a point in time t1, i.e. t1 is the point in time from which the leading tip is immersed below the surface of the molten metal bath. In the shown graph, a single feeding velocity is applied, but the feeding may comprise several phases with different feeding velocities. Even a phase without feeding; i.e. a stationary phase, can be included during the conduction of a measurement as indicated in the graph shown in FIG. 4, representing another preferred embodiment. The temperature measurement is obtained during a measurement time period during t1 to t2. The leading tip has to be immersed under the surface of the molten metal bath to obtain reliable measurements. Temperature values obtained in an early phase of the feeding may often be not representative for the bulk temperature of the molten metal bath. After t2, the optical cored wire is retracted from the molten metal bath back to a position above the surface. Ideally, the part of the optical cored wire immersed under the surface of the molten metal bath $L_c$ is consumed until t2.

The required time for a complete consumption of the immersed part of the optical cored wire to the surface of the molten metal bath is dependent on the temperature of the molten metal and the characteristics of the optical cored wire. The said characteristics of the optical cored wire affecting its melting or consumption behavior include its design and the materials it is made of. For example, a metal tube with a higher wall thickness will melt slower than a metal tube of the same material with a thinner wall thickness. Since the consumption of the optical cored wire is expected to be the faster the higher the temperature of the molten metal bath, the duration of the measurement profile may be the shorter the higher the temperature of the molten metal bath. For the given reasons, it is advantageous that the parameters of the feeding scheme are adjusted to the temperature to be measured.

The melting and devitrification behavior of the optical cored wire depends on the amount of heat transfer from the environment, which is directly related to the velocity the leading tip is fed with. Especially in cases in which previous measurements have been conducted, the part of the immersion end comprising the leading tip may already be damaged. The longer the residence time during a previous measurement sequence in the thermally demanding zones, the more damage can be observed. Applying the method according to the present invention will minimize this damage.

Figure 5:
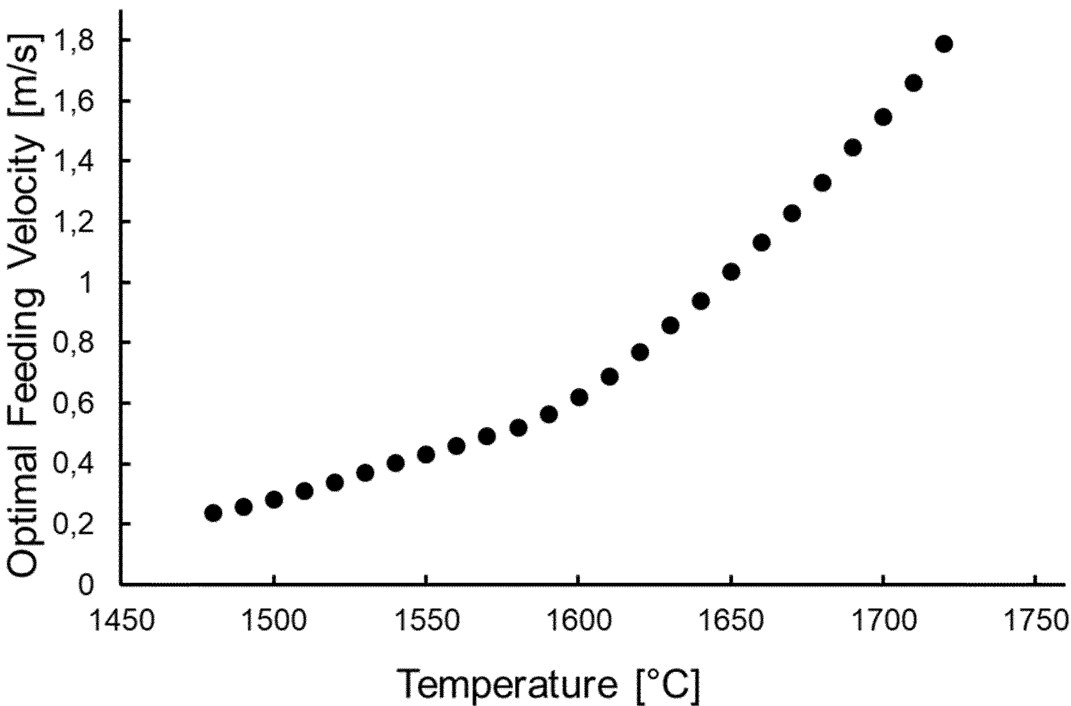
FIG. 5 shows a graph illustrating the relation of optimal feeding velocity and the measured bath temperature.

It has been observed that different parameters applied to obtain a temperature value during the application of a measurement profile deliver varying measurement qualities. The measurement quality of a measurement profile refers to different measurement accuracies compared to measurement values obtained by using a stationary installed standard thermocouple. The idea underlying the present invention is an adaption of the specific measurement profile to the temperature expected to be measured. FIG. 5 shows a graph illustrating the relation of optimal feeding velocity applied during a measurement sequence; i.e. the application of a measurement profile; and the obtained temperature. This dependency may be related to the melting and decomposition behavior of the optical cored wire, which is known to be dependent on the temperature of the molten metal bath. Preferably, the mean feeding velocity of the leading tip is chosen the faster, the higher the temperature expected to be measured.

Figure 6:
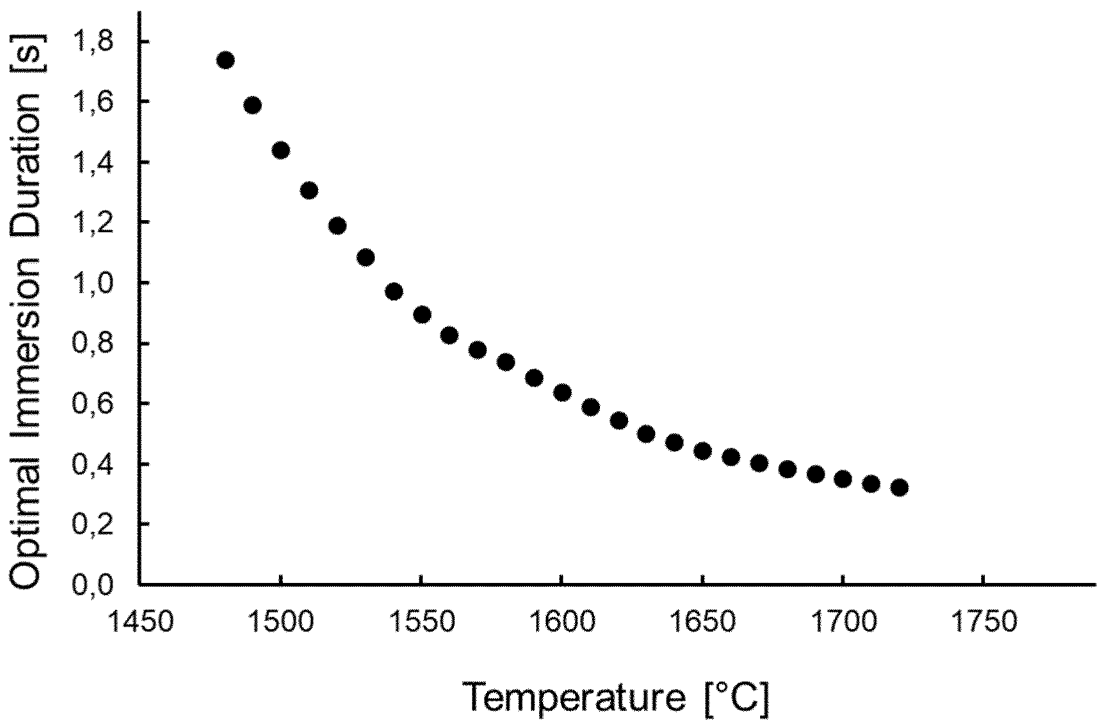
FIG. 6 shows a graph illustrating the relation of optimal immersion duration and the measured bath temperature.

FIG. 6 shows a graph illustrating the relation of the optimal duration of the immersion of the leading tip of the optical cored wire in a measurement sequence; i.e. the duration between t1 and t2 in FIG. 3 and FIG. 4; and the obtained temperature. The recognizable correlation between a shorter duration of the immersion for higher bath temperatures indicates that the time the optical cored wire is immersed in the molten metal part should preferably be chosen the shorter, the higher the expected temperature of the molten metal bath.

FIG. 7 shows the expected development of the temperature of a molten metal bath with time for an exemplary EAF process, illustrating a constant increase in temperature. This development represents an exemplary model for the development of the temperature of a molten metal bath. Furthermore, FIG. 7 indicates the relation of the parameters and variables on which the temperature prediction step is based. According to an embodiment of the invention, a measurement is conducted at a point in time t(n) resulting in a measured temperature value $T_{mes}$(n) for that point in time. The measurement profile which is applied is previously chosen based on a temperature $T_{pred}$(n) which is expected for that point in time. Since the temperature $T_{pred}$(n) is a predicted temperature, it can differ from the measured temperature value $T_{mes}$(n). It shall especially be emphasized, that the point in time which relates to the predicted temperature value $T_{pred}$(n) does not necessarily correspond to the point in time t(n) which relates to the measured temperature value $T_{mes}$(n) in the model describing the expected temperature development of the molten metal bath. After the determination of the first measured temperature value $T_{mes}$(n), a point in time for a second temperature measurement t(n+1) is defined later than t(n) after a pre-determined time duration Δt. The temperature value which is expected for this point in time $T_{pred}$(n+1) is required as a basis for the selection of the most suitable measurement profile for this second measurement. This temperature value is predicted based on the expected development for the temperature of the molten metal bath during the time duration Δt between t(n) and t(n+1).

FIG. 8 shows a schematic view of a system 30 according to an embodiment of the invention. The system 30 is configured to perform the method according to the invention. In particular, it is configured to provide a set of data, relating predicted temperatures with measurement profiles which deliver optimal measurement qualities for the respective predicted temperature. The system 30 is further configured to predict such a temperature. Furthermore, the system 30 is configured to define a time step. Additionally, the system 30 is configured to calculate a temperature, based on the model describing the temperature development of a molten metal bath with time. Such a calculated temperature is also to be understood as a predicted temperature. The system 30 is further configured to supply the model. Additionally, the system 30 is configured to choose a measurement profile from the provided set of data. The chosen measurement profile is either based on a predicted temperature or a temperature calculated based on the model. Furthermore, the system 30 is configured to apply this measurement profile.

The system comprises a device 40, wherein the device 40 comprises an optical cored wire and a detector. Furthermore, the system comprises a module 50. Device 40 and module 50 are adapted to interact with each other; i.e. the module is configured to carry out the method according to the invention with the device 40, resulting in the measurement of temperature values of a molten metal bath.

FIG. 9 shows a schematic of the module 50 in more detail. The module 50 comprises a storage unit 50, a processing unit 70 and a controlling unit 80.

In the following, exemplary conditions according to the inventive method will be given.

EXAMPLE

A device comprising an optical cored wire was installed in a representative electric arc furnace (EAF) installation according to FIG. 2. The optical cored wire comprised a graded index fiber with a core diameter of 50 μm and a stainless-steel tube with an outer diameter of 1.3 mm. The fiber with metal tube was embedded in a stainless-steel tube with an outer diameter of 6 mm and a wall thickness of 0.3 mm.

The EAF was loaded with scrap and the melting process was initiated. For the typical electric input power of 60 MW, a temperature development as shown in FIG. 7 was expected, based on previous measurements.

Based on historical data of the metallurgical facility and the consumed accumulated power of the EAF, the expected temperature was 1540° C. for the point in time for a first measurement. A measurement profile for an expected temperature of 1540° C. was selected, defining the mean feeding velocity with 0.4 m/s and the duration of the profile with 1.0 s. The obtained temperature value was 1560° C., i.e. the measurement of the actual temperature of the molten metal bath resulted in a higher temperature value than predicted. For the specific metallurgical facility, a temperature increase of 15° C./min was expected for this temperature range. A next measurement was planned 2 min after the first measurement; i.e. the expected temperature was 1590° C. A measurement profile for an expected temperature of 1590° C. defined the optimal mean feeding velocity with 0.5 m/s and the duration of the profile with 0.75 s. A measured temperature value of 1600° C. was obtained after the application of the second measurement profile at the point in 1 min after the first measurement.

A third measurement was planned 1 min after the second measurement. According to the expected temperature development, the temperature expected to be measured was 1620° C. and the respective measurement profile defined the optimal mean feeding velocity with 0.8 m/s and the duration of the profile with 0.54 s. The measured temperature obtained was 1625° C.

LIST OF REFERENCE NUMERALS

1, 1', 1'', 1''' Optical cored wire
2', 2'', 2''' Optical fiber

3', 3", 3''' Metal tube
4", 4''' Second metal tube
5", 5''' Void space between metal tubes
6 Installation
7 Molten metal bath
8 Coil
9 Opposite end (end of cored wire connected to detector)
10 Detector
11 Vessel; metallurgical container
12 Feeder
13 Guide tube
14 Entry point
15 Leading tip of optical cored wire
$MB_S$ Surface of molten metal bath
17 Slag layer
18 Blowing lance
19 Part of the cored wire immersed in the molten metal bath
$L_c$ Length of optical cored wire immersed in the molten metal bath
20 Part of cored wire subjected to hot atmosphere and slag
30 System
40 Device
50 Module
60 Storage unit
70 Processing unit
80 Controlling unit

The invention claimed is:

1. A system for determining a series of at least two temperature values $T_{mes}(n)$ and $T_{mes}(n+1)$ of a molten metal bath comprising a device and a module and the module is adapted to interact with the device, wherein the device comprises an optical cored wire and a detector, the system configured to feed a leading tip of the optical cored wire below the surface of the molten metal bath, wherein the module comprises a storage unit, a processing unit and a controlling unit, wherein the storage unit comprises:

(a1) a storage element for providing a set of data relating predicted temperature values $T_{pred}$ of a molten metal bath to corresponding measurement profiles MP, each measurement profile being a sequence of steps carried out to obtain the temperature of the molten metal bath;

(a2) a storage element for supplying a model F(t) describing the temperature development of the molten metal bath with time; and (a3) a storage element for defining a time step Δt;

wherein the processing unit comprises:

(b1) a processing element for selecting a future point in time t(n) and predicting a temperature $T_{pred}$ of the molten metal bath for the future point in time t(n);

(b2) a processing element for choosing a measurement profile MP corresponding to a predicted temperature $T_{pred}$ from a provided set of data relating predicted temperature values $T_{pred}$ to corresponding measurement profiles MP; and (b3) a processing element for calculating a predicted temperature $T_{pred}$ of the molten metal bath based on a measured temperature value $T_{mes}$, the model F(t) and the time step Δt; and wherein the controlling unit comprises:

(c1) a controlling element for applying a measurement profile MP at a point in time to obtain a measured temperature value $T_{mes}$.

2. A method for determining a series of at least two temperature values $T_{mes}(n)$ and $T_{mes}(n+1)$ of a molten metal bath using a system according to claim 1, the method comprising:

(a) providing the set of data relating predicted temperature values $T_{pred}$ of the molten metal bath to the corresponding measurement profiles MP, wherein each measurement profile comprises at least one of the following steps:

(i) providing the optical cored wire with its leading tip above the surface of the molten metal bath;

(ii) feeding the leading tip of the optical cored wire for a time period from t0 to t2 with at least one feeding velocity $V_{fed}$ towards the molten metal bath and below the surface of the molten metal bath, wherein the leading tip of the optical cored wire is below the surface of the molten metal bath during a time period from t1 to t2;

(iii) obtaining temperature information within a measuring time period within t1 to t2; and (iv) retracting the optical cored wire with a velocity $V_{ret}$ to a position above the molten metal bath;

(b) supplying the model F(t) describing the temperature development of the molten metal bath with time;

(c) defining the time step Δt;

(d) selecting the future point in time t(n) and predicting the temperature value $T_{pred}(n)$ of the molten metal bath for the point in time t(n);

(e) choosing the measurement profile MP(n) corresponding to the predicted temperature value $T_{pred}(n)$ from the provided set of data relating predicted temperature values $T_{pred}$ to corresponding measurement profiles MP;

(f) applying the measurement profile MP(n) at the point in time t(n) to obtain the measured temperature value $T_{mes}(n)$;

(g) calculating a predicted temperature value $T_{pred}(n+1)$ of the molten metal bath based on the measured temperature value $T_{mes}(n)$, the model F(t) and the time step Δt;

(h) choosing a measurement profile MP(n+1) corresponding to the predicted temperature value $T_{pred}(n+1)$ from the provided set of data relating predicted temperature values $T_{pred}$ to corresponding measurement profiles MP; and (i) applying the measurement profile MP(n+1) at a point in time t(n+1) to obtain a measured temperature value $T_{mes}(n+1)$, wherein t(n+1) is defined by $$t(n+1)=t(n)+\Delta t.$$

3. The method according to claim 2, wherein the molten metal is a molten steel.

4. The method according to claim 2, wherein the model F(t) describing the temperature development of the molten metal bath with time is a linear function.

5. The method according to claim 2, wherein the model F(t) describing the temperature development is based on previous measurements.

6. The method according to claim 2, wherein the model F(t) describing the temperature development of the molten metal bath with time is based on operational parameters.

7. The method according to claim 2, wherein the model F(t) describing the temperature development of the molten metal bath with time is derived by a method comprising:

(i) providing a set of data relating characteristics of a molten metal bath with recorded data for models F(t) for the development of the temperature of a molten metal bath with time;

(ii) providing characteristics of the molten metal bath; and (iii) receiving a model F(t) corresponding to the characteristics of the molten metal bath from the provided set of data relating characteristics of a molten metal bath with recorded data for models F(t) for the development of the temperature of a molten metal bath with time.

8. The method according to claim 2, wherein the duration of the time step Δt is derived by a method comprising:

(i) providing a set of data relating operational parameters with durations for time steps Δt;

(ii) providing operational parameters; and (iii) receiving a duration for the time step Δt from the provided set of data relating to the operational parameters.

9. The method according to claim 2, wherein the choice of the duration of the time step Δt is based on the measured temperature value $T_{mes}(n)$ of step (f).

10. The method according to claim 2, wherein the measurement profile MP further defines a step within a stationary time period within t1 to t2, during which the feeding of the leading tip of the optical cored wire is paused with or the leading tip of the optical cored wire is fed with a low speed.

11. The method according to claim 10, wherein the feeding in step (a)(ii) of a measurement profile MP comprises at least two feeding velocities $V_{fed}$1 and $V_{fed}$2.

12. The method according to claim 10, wherein the feeding velocity $V_{fed}(n+1)$ of measurement profile MP(n+1) is higher than the feeding velocity $V_{fed}(n)$ of measurement profile MP(n).

13. The method according to claim 10, wherein the duration of the time period from t1 to t2 is shorter for measurement profile MP(n+1) than for measurement profile MP(n).

14. The method according to claim 2, wherein the feeding in step of a measurement profile MP comprises at least two feeding velocities $V_{fed}$1 and $V_{fed}$2.

15. The method according to claim 14, wherein the duration of the time period from t1 to t2 is shorter for measurement profile MP(n+1) than for measurement profile MP(n).

16. The method according to claim 2, wherein the feeding velocity $V_{fed}(n+1)$ of measurement profile MP(n+1) is higher than the feeding velocity $V_{fed}(n)$ of measurement profile MP(n).

17. The method according to claim 2, wherein the duration of the time period from t1 to t2 is shorter for measurement profile MP(n+1) than for measurement profile MP(n).

18. The method according to claim 2, wherein step (a)(iii) is at least partly performed during step (a)(ii).

19. The system of claim 1, wherein the optical cored wire has a linear density in a range of from 25 to 80 g/m.

* * * * *